(12) United States Patent
Paz et al.

(10) Patent No.: US 12,039,630 B2
(45) Date of Patent: Jul. 16, 2024

(54) THREE-DIMENSIONAL POSE DETECTION BASED ON TWO-DIMENSIONAL SIGNATURE MATCHING

(71) Applicant: QUALCOMM Incorporated, San Diego, CA (US)

(72) Inventors: Ophir Paz, Floirac (FR); Gary Franklin Gimenez, Bordeaux (FR)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 17/821,620

(22) Filed: Aug. 23, 2022

(65) Prior Publication Data
US 2024/0070928 A1      Feb. 29, 2024

(51) Int. Cl.
*G06T 11/00* (2006.01)
*G06T 7/70* (2017.01)

(52) U.S. Cl.
CPC ............. *G06T 11/00* (2013.01); *G06T 7/70* (2017.01); *G06T 2207/20081* (2013.01)

(58) Field of Classification Search
CPC ... G06T 11/00; G06T 7/70; G06T 2207/2008; G06T 1/20; G06N 20/00; G06N 3/02; G06N 7/02; G06V 10/70; G06V 30/194; G06V 40/10; G06V 40/107; G06V 40/11; G06V 40/113

See application file for complete search history.

(56) References Cited

U.S. PATENT DOCUMENTS

2023/0020713 A1* 1/2023 Wada .................. G06T 17/20
2023/0070008 A1* 3/2023 Kulon .................. G06T 3/40

* cited by examiner

*Primary Examiner* — Maurice L. McDowell, Jr.
*Assistant Examiner* — Donna J. Ricks
(74) *Attorney, Agent, or Firm* — Patterson + Sheridan, L.L.P.\Qualcomm

(57) ABSTRACT

Certain aspects of the present disclosure provide techniques for determining a pose of a three-dimensional deformable object. Embodiments include providing one or more inputs to a machine learning model based on a computer-generated three-dimensional deformable object that has a known pose. Embodiments include determining, based on one or more outputs from the machine learning model in response to the one or more inputs, a two-dimensional signature of the computer-generated three-dimensional deformable object. Embodiments include associating the two-dimensional signature with the known pose of the computer-generated three-dimensional deformable object. Embodiments include determining a respective pose of an actual three-dimensional deformable object based on an image of the actual three-dimensional deformable object and the associating.

24 Claims, 5 Drawing Sheets

THREE-DIMENSIONAL POSE DETECTION BASED ON TWO-DIMENSIONAL SIGNATURE MATCHING

INTRODUCTION

Aspects of the present disclosure relate to determining a pose of a three-dimensional object based on a two-dimensional signature determined from an image of the object.

Determining a pose of a three-dimensional object is useful for a variety of purposes, such as object tracking, image detection, augmented reality, and the like. For example, a user may provide input to a computer system via gestures captured by a camera, and interpreting the gestures may require determining a pose of the user's hand. A pose generally refers to an orientation of a three-dimensional object relative to a source of an image such as a camera.

While there are techniques for determining a pose of a three-dimensional object based on three-dimensional or stereo image data, these techniques require specialized hardware for capturing three-dimensional images or multiple cameras for capturing stereo image data, and large amounts of computing resources for processing such images. It is challenging to accurately determine a pose of a three-dimensional object based only on two-dimensional image data, as many three-dimensional poses are virtually indistinguishable from one another when captured in two-dimensional images. These challenges are accentuated when the three-dimensional object is a deformable object such as a human hand, as deformable objects can deform into many different poses with subtle distinctions that may not be visible in two-dimensional images.

Accordingly, there is a need for improved techniques of determining a pose of a three-dimensional object based on two-dimensional image data.

BRIEF SUMMARY

Certain aspects provide a method, including: providing one or more inputs to a machine learning model based on a computer-generated three-dimensional deformable object that has a known pose; determining, based on one or more outputs from the machine learning model in response to the one or more inputs, a two-dimensional signature of the computer-generated three-dimensional deformable object; associating the two-dimensional signature with the known pose of the computer-generated three-dimensional deformable object; and determining a respective pose of an actual three-dimensional deformable object based on an image of the actual three-dimensional deformable object and the associating.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1B:
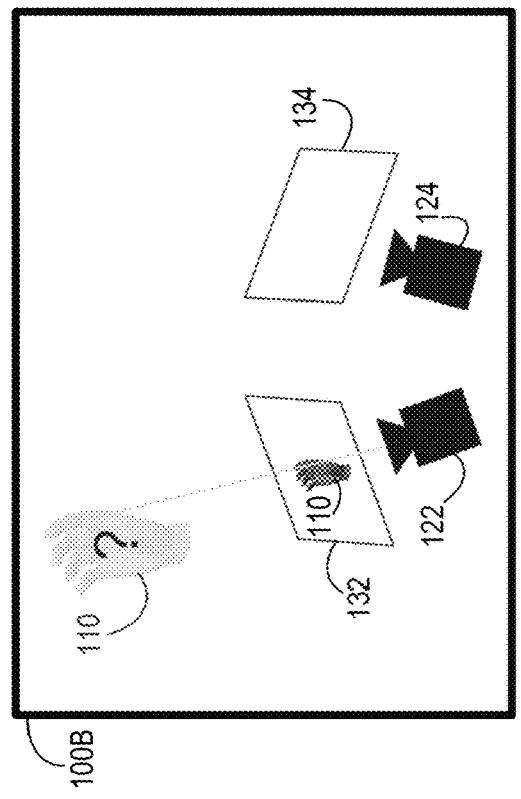
FIGS. 1A and 1B are illustrations of prior art techniques related to determining poses of three-dimensional objects from image data.

Aspects of the present disclosure provide apparatuses, methods, processing systems, and non-transitory computer-readable mediums for determining a pose of a three-dimensional object through two-dimensional signature matching.

There are cases when three-dimensional or stereo image data is not available or is otherwise impractical to obtain such as due to hardware and/or computing resource constraints. In such cases, determining a pose of a three-dimensional object based on two-dimensional image data is challenging due to similarities in appearance of different three-dimensional poses when captured in two-dimensional images.

Accordingly, techniques described herein involve the use of a signature database in which two-dimensional signatures of objects are stored in association with known three-dimensional poses of the objects. A two-dimensional signature of an object may be determined, for example, based on key-points of the object that are identified through the use of a machine learning model. Techniques for identifying three-dimensionally coherent locations of particular points on objects in images through machine learning, such as to determine key-points in a two-dimensional image of a three-dimensional object, is described in a U.S. patent application by the same inventors, having, entitled "STEREOVISION ANNOTATION TOOL," and filed on the same day as the present application, the contents of which are incorporated herein by reference in their entirety.

Once the signature database is populated with a set of known three-dimensional poses associated with two-dimensional signatures that correspond to the known three-dimensional poses, the signature database may be used to determine a three-dimensional pose of a "new" object based on a two-dimensional signature of the new object. For example, the two-dimensional signature of the new object may be compared to two-dimensional signatures in the database to determine a closest match (or a set of closest matches), and the three-dimensional pose (or poses) associated with the closest match(es) may be used to determine the three-dimensional pose of the new object. If multiple matches are determined, then the three-dimensional poses associated with the multiple matches may be aggregated (e.g., averaged) to determine the three-dimensional pose of the new object.

In order to populate the signature database, it may be advantageous to make use of synthetic data so that the poses and corresponding signatures in the database may be carefully staged and efficiently generated. Thus, computer-generated images of three-dimensional objects may be utilized. However, the two-dimensional key-points of a computer-generated image of a three-dimensional object may not be the same as what would be determined by a trained machine learning model. For example, the key-points of a computer-generated three-dimensional object are precisely known, whereas a trained machine learning model identifies key-points in an image according to its training, and the training data used to train the model will bias its outputs. Thus, embodiments of the present disclosure account for model bias during population of the signature database by using the machine learning model to determine key-points for computer-generated three-dimensional objects rather than using the precise known key-points of the computer-generated three-dimensional objects.

In an example, the machine learning model is used to determine key-points of a given computer-generated three-dimensional object, the key-points are used to compute a two-dimensional signature, and the two-dimensional signature is stored in the signature database in association with a known pose of the computer-generated three-dimensional object. Subsequently, once the signature database is populated, the machine learning model is used to determine key-points of an actual three-dimensional object from a two-dimensional image of the actual three-dimensional object, and the key-points are used to compute a two-dimensional signature. The two-dimensional signature is then compared to the two-dimensional signatures stored in the signature database (which was populated based on data generated using the same machine learning model, and thus accounts for the model's biases) to determine a best one or more matches for use in determining a three-dimensional pose of the actual three-dimensional object.

It is noted that the terms "pose" and "three-dimensional pose" are used interchangeably herein, and that the terms "signature" and "two-dimensional signature" are used interchangeably herein.

Some existing solutions use machine learning to address the issue occlusion (e.g., part of a deformable object being invisible in a two-dimensional image) and three-dimensional information being unavailable, but those solutions include bias, errors, and are highly dependent on the training data used to train the machine learning models to output poses. As such, these techniques behave poorly when provided with inputs unseen during the learning phase. Other existing solutions use optimization-based methods to derive the parameters of a kinematic model of the object that best fit the two-dimensional input. These solutions are usually computationally intensive (e.g., involving a large amount of time and battery consumption) and the amount of resources required grows with the number of parameters of the model (e.g., object complexity).

Embodiments of the present disclosure provide several technical improvements with respect to existing techniques for determining poses of three-dimensional objects from image data. For example, techniques described herein do not require the use of three-dimensional or stereo image data, thereby avoiding the need for specialized hardware and reducing the amount of computing resources required to store, process, and transmit the image data. Furthermore, by relying on signature matching for pose determination and using machine learning only for two-dimensional signature determination, techniques described herein do not require large, resource-intensive machine learning models that are trained to recognize three-dimensional poses, and further avoid the biases and errors associated with such models. Additionally, by utilizing synthetic data for populating the signature database while using the same machine learning model when determining signatures for the synthetic data that is used to determine signatures of live data, embodiments of the present disclosure allow the signature database to be populated with carefully curated and efficiently generated data, requiring only a minimal amount of ground truth data, while accounting for biases of the machine learning model. Techniques described herein allow poses to be accurately and efficiently determined even for deformable three-dimensional objects based only on two-dimensional image data through the use of a signature database that is populated in a targeted manner with particular known poses of such objects in association with two-dimensional signatures known to correspond to those particular known poses. Thus, embodiments of the present disclosure address the issue of occlusion (e.g., when part of a deformable object is invisible in a two-dimensional image) by allowing a full three-dimensional pose (including occluded portions of the object) to be determined based on two-dimensional signature matching.

Furthermore, certain techniques described herein utilize a multiplicity of matchings to derive a solution pose instead of trying to find the best solution through single shot (which could require a significantly larger set of poses to be stored in the signature database). Thus, embodiments of the present disclosure are optimal in terms of computing resource utilization.

Addressing Problems Associated with Prior Art Solutions

Figure 1A:
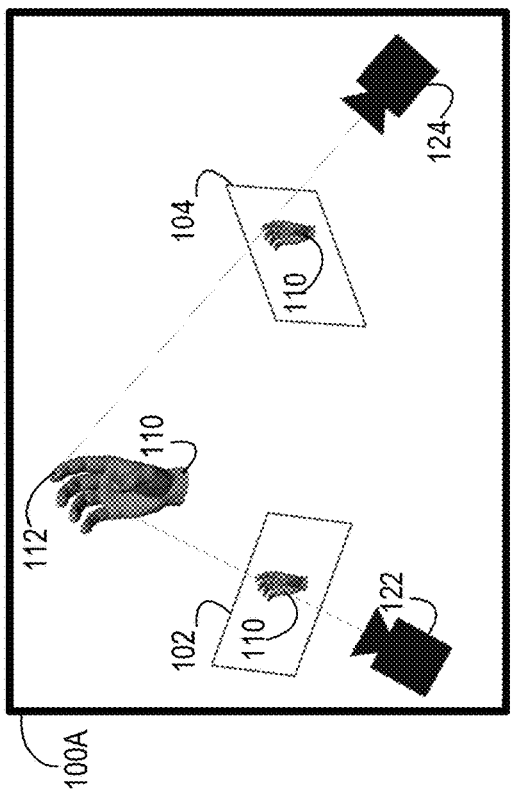

FIG. 1A includes an illustration 100A of a prior art solution for determining a pose of a three-dimensional object based on image data, particularly involving the use of stereo image data.

Cameras 122 and 124 are used to capture two images 102 and 104, from two different perspectives, of an object 110 (e.g., a human hand). Images 102 and 104 together make up a stereo image, and represent different perspectives of the same object 110 captured at the same time.

The stereo image allows points such as point 112 on object 110 (e.g., a fingertip of the hand) to be triangulated, thereby effectively providing three-dimensional data. Thus, the three-dimensional data can be used to determine a pose of object 110. Other existing techniques may involve the use of a depth sensor to produce three-dimensional data for use in determining a pose of a three-dimensional object.

However, there are many cases in which stereo image data or depth data cannot be obtained, such as due to hardware and/or computing resource constraints. Thus, the prior art technique depicted in FIG. 1A is not practical to perform in many cases.

FIG. 1B includes an illustration 100B of a prior art system for capturing image data, particularly in which two cameras with non-overlapping fields of view are available.

Cameras 122 and 124 are used to capture two images 132 and 134, such as for use in an augment reality (AR) or virtual reality (VR) application. For example, cameras 122 and 124 may be included in a VR/AR headset to provide a large field of view for image capture. However, images 132 and 13 do not overlap with one another because the fields of view of cameras 122 and 124 do not overlap with one another. Thus, only a single two-dimensional image of an object 110 (e.g., a human hand) is available. Determining a pose of object 110 may be difficult based only on image 132, as three-dimensional data such as a stereo image or depth data is not available.

Similar challenges to those faced in the prior art system depicted in FIG. 1B are also present in systems involving only a single camera or involving multiple cameras with fields of view that only minimally overlap. Techniques described herein address these challenges, as described in more detail below with respect to FIGS. 2-5.

Pose Detection Through Two-Dimensional Signature Matching

Figure 2:
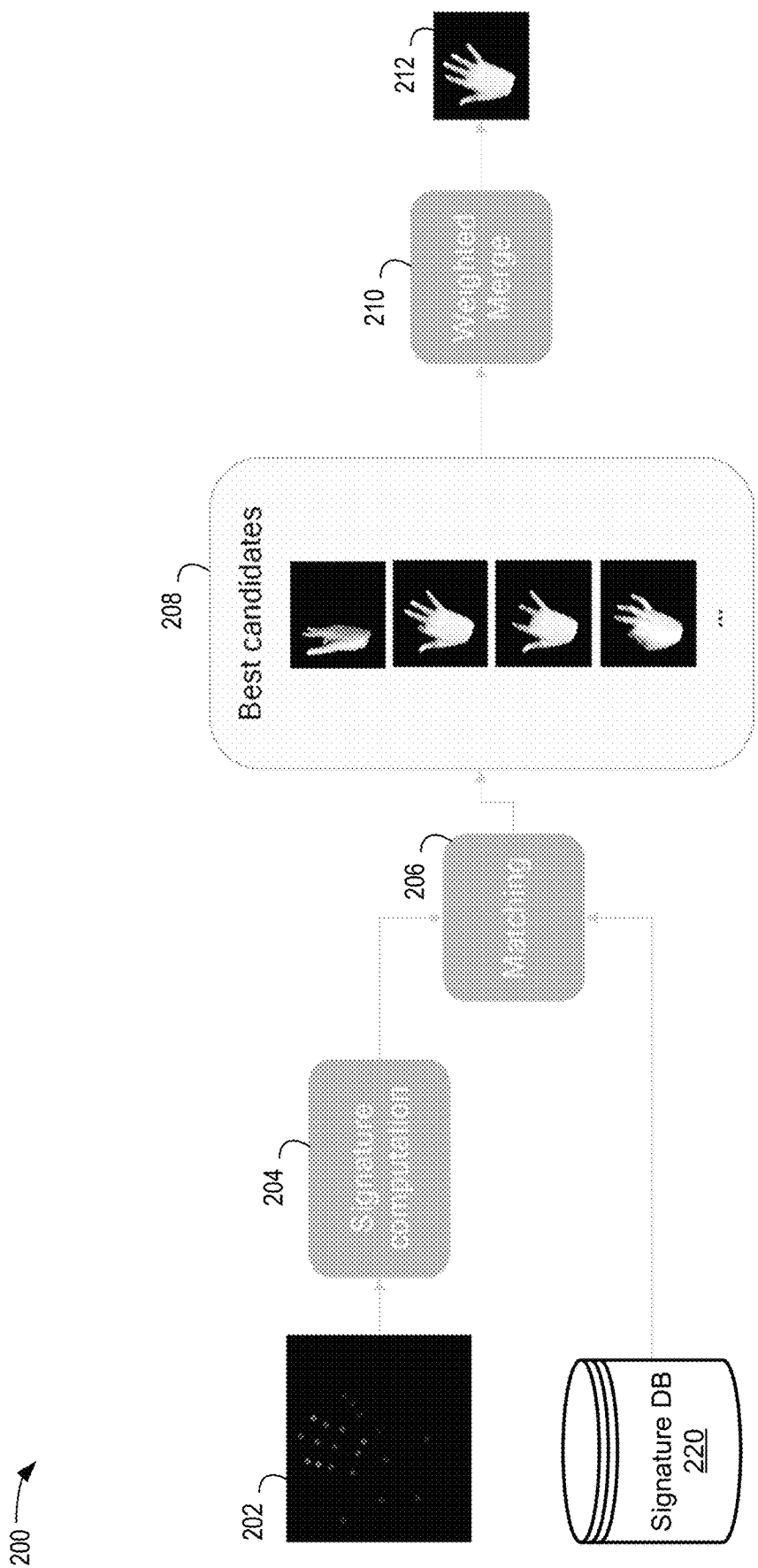
FIG. 2 depicts an example of a process for determining poses of three-dimensional objects through two-dimensional signature matching.

FIG. 2 depicts an example of a process 200 for determining poses of three-dimensional objects through two-dimensional signature matching.

A signature database (DB) 220 is populated with two-dimensional signatures of objects associated with known three-dimensional poses of the objects. For example, as described in more detail below with respect to FIG. 3, computer-generated images of three-dimensional objects may be generated, a machine learning model may be used to determine signatures based on the computer-generated images, and the signatures may be associated in signature DB 220 with known poses of the three-dimensional objects in the computer-generated images. Poses may be identified in signature DB 220 by unique identifiers of the poses, such as three-dimensional data describing the poses.

Once signature DB 220 is populated, it is used for signature matching to determine poses of objects for which poses are not previously known based on two-dimensional images of the objects.

Key-points 202 of a three-dimensional object are determined from a two-dimensional image of the three-dimensional object. For example, as described in more detail below with respect to FIG. 3, one or more inputs may be provided, based on the two-dimensional image, to a machine learning model that has been trained to determine key-points in such images. In the example of a human hand, which is a deformable three-dimensional object, the key-points may include a set of points of interest such as corresponding to joints, palm, fingertips, and/or the like. The key-points 202 determined using the machine learning model are used to compute a signature at signature computation 204. In alternative embodiments, the machine learning model is trained to directly output a signature.

Signature computation 204 may involve, for example, computing distances or relationships between locations of particular key-points. For example, signature computation 204 may comprise applying a fixed formula to a given set of key-points. The fixed formula may be a signature function that produces a unique identifier of a two-dimensional representation of a three-dimensional pose. The signature function generates identifiers that are invariant to two-dimensional isometry and scaling, such that two-dimensional representations of three-dimensional poses that only differ by scale, rotation, and/or translation will result in the same signature.

A signature determined through signature computation 204 is then used to perform matching 206 with respect to the signatures stored in signature DB 220. For example, the signature may be compared to all signatures stored in signature DB 220, such as based on a similarity measure, to determine best candidates 208. In one example, signatures are compared to one another based on a measure of similarity such as edit distance, numerical comparison, cosine similarity, and/or the like.

Best candidates 208 represent one or more poses that correspond to one or more signatures in signature DB 220 that are most similar to the signature of the object represented by key-points 202 (e.g., having a similarity measure that meets a threshold or other condition). If only one best candidate 208 is determined, then that pose may be selected as the pose 212 of the object. If multiple best candidates 208 are determined, then these best candidates 208 may be aggregated to determine the poses 212 of the object. For example, a weighted merge 210 may be performed, in which the poses represented by best candidates 208 are averaged in a weighted manner that applies higher weights to poses that correspond to signatures that are more similar to the signature of the object (e.g., having a similarity measure that indicates a higher level of similarity) than to poses that correspond to signatures that are less similar to the signature of the object. The weighted merge 210 may involve averaging poses in an intelligent manner that preserves the integrity of the object (e.g., a hand) such that the resultant pose is consistent with the physical constraints of the object. For example, individual points in the poses may be averaged with respect to one another and, if a resulting average would produce a point that is inconsistent with the physical constraints of the object, a location of the point may be set to the nearest location that would be consistent with the physical constraints of the object. It is noted that techniques described herein for aggregating multiple poses, such as weighted merge 210 techniques, are included as examples, and other methods of aggregating multiple candidate poses to produce a pose of an object are possible without departing from the scope of the present disclosure.

Pose 212 is determined as a result of weighted merge 210 (or directly as a result of matching 206, such as if only a single best candidate 208 is identified). Pose 212 is a three-dimensional pose of the object represented by key-points 202, determined based on a two-dimensional image of the object.

Accounting for Model Bias

Figure 3:
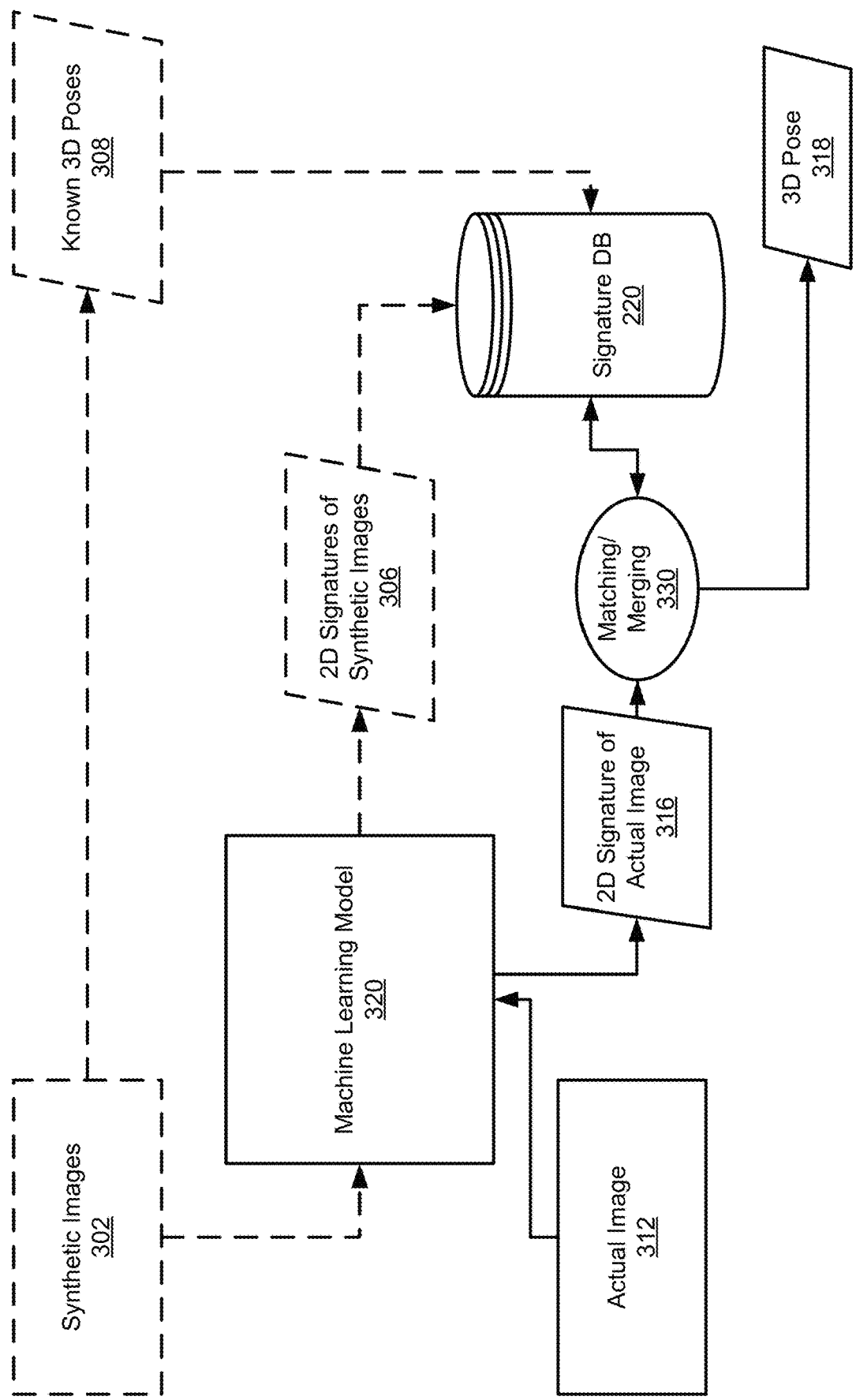
FIG. 3 depicts an example technique for accounting for model bias in two-dimensional signature matching for pose detection.

FIG. 3 depicts an example technique for accounting for model bias in two-dimensional signature matching for pose detection. FIG. 3 includes signature DB 220 of FIG. 2.

A machine learning model 320 has been trained to output key-points of an object based on a two-dimensional image of the object, such as based on historical two-dimensional images of object that have been labeled with known locations of key-points in the images. For example, machine learning model 320 may have been trained based on training data created through a guided process for generating training data that is three-dimensionally coherent. Machine learning model 320 may accept one or more inputs describing a two-dimensional image (e.g., the image itself or one or more features of the image), and may output locations (e.g., XY coordinates) of one or more points of interest (e.g., key-points) in the image.

In some embodiments, training of machine learning model 320 may be a supervised learning process that involves providing training inputs (e.g., features describing an image) as inputs to the model. The model processes the training inputs and outputs locations (e.g., XY coordinates with respect to the images) with respect to the training inputs. The outputs are compared to labels (e.g., known locations of points of interest) associated with the training inputs to determine the accuracy of the model, and the model is iteratively adjusted until one or more conditions are met. Machine learning model 320 may, for example, comprise a neural network. Neural networks generally include a collection of connected units or nodes called artificial neurons. The operation of neural networks can be modeled as an iterative process. Each node has a particular value associated with it. In each iteration, each node updates its value based upon the values of the other nodes, the update operation typically consisting of a matrix-vector multiplication. The update algorithm reflects the influences on each node of the other nodes in the network.

Once machine learning model 320 is trained, inputs may be provided to machine learning model 320 based on a two-dimensional image, and machine learning model 320 outputs one or more locations within the image, such as indicating locations of key-points of an object in the image.

In order to populate signature DB 220, synthetic images 302 may be generated. Synthetic images 302 represent computer-generated two-dimensional images of three-dimensional objects in particular known poses. The full range of possible poses of a given object may be too large to include in signature DB 220 while still allowing matching to be performed efficiently, so a subset of all possible poses may be chosen. The poses depicted in synthetic images 302 may be selected based on which poses are best suited for aggregating (e.g., merging/averaging) poses together, which may be determined through experimentation and/or calculation. For example, synthetic images 302 may depict a given deformable object (e.g., a human hand) in a series of poses that represent a range of common poses, such as in incremental stages of a range of motion of the deformable object.

While the actual key-points of a deformable object in synthetic images 302 may be known, machine learning model 320 is used to determine the key-points so that biases of machine learning model 320 are embedded in signature DB 220. Thus, one or more inputs are provided to machine learning model 320 based on each synthetic image 302, and machine learning model 320 outputs a set of key-points for each synthetic image 302 based on the inputs. Key-points output by machine learning model 320 are used to compute two-dimensional (2D) signatures 306 of the synthetic images. Alternatively, machine learning model 320 is trained to directly output signatures.

As explained above with respect to FIG. 2, 2D signatures 306 may be determined by computing a signature function that produces a unique identifier of a two-dimensional representation of a three-dimensional pose based on key-points.

2D signatures 306 are stored in signature DB 220 in association with known three-dimensional (3D) poses 308 of synthetic images 302. For example, signature DB 220 may comprise a key-value store where 2D signatures 306 are keys and known 3D poses 308 are values. The biases of machine learning model 320 are accounted for in signature DB 220 because machine learning model 320 was used to generate 2D signatures 306.

Once signature DB 220 is populated, signature matching is used to determine a pose of a given three-dimensional object based on a two-dimensional image of the object.

One or more inputs are provided to machine learning model 320 based on an actual image 312 of a three-dimensional object. For example, actual image 312 may be captured via a camera associated with a computing device, and may be a two-dimensional image of a three-dimensional deformable object, such as a human hand. Machine learning model 320 may output key-points for the object based on the inputs.

The key-points output by machine learning model 320 for actual image 312 are used to determine a 2D signature 316 of actual image 312, such as by applying a signature function to the key-points. 2D signature 316 is then used to perform matching/merging 330, during which 2D signature 316 is compared to the 2D signatures 306 stored in signature DB 220. For example, a similarity measure between 2D signature 316 and each 2D signature 306 may be determined, and one or more known 3D poses 308 that correspond to one or more 2D signatures 306 with the highest (or lowest) similarity measures (e.g., above or below a threshold) may be selected as candidate poses. If a single candidate pose is identified, then that candidate pose may be determined to be the 3D pose 318 of the object in actual image 312. If multiple candidate poses are identified, then the multiple candidate poses may be aggregated (e.g., using a weighted average) to determine the 3D pose 318 of the object in actual image 312.

In some cases, if 3D pose 318 is confirmed to be accurate (e.g., based on manual review), then 2D signature 316 and 3D pose 318 may added to signature DB 220 in association with one another for use in determining future poses of objects.

It is noted that while certain embodiments described herein involve determining a pose of a single object, other embodiments may determine individual poses of component objects of a larger object (e.g., fingers of a hand) separately using techniques described herein and then bootstrapping the different poses together to produce an overall pose of the larger object.

Furthermore, some embodiments involve different signature databases or different portions of the signature database for different types of objects. For example, signature DB 220 may be divided by object type so that, if a given object type (e.g., a hand) is present in actual image 312, the signature of the object will only be compared to signatures in signature DB 220 that correspond to that particular object type. For example, each signature/pose pair in signature DB 220 may also be associated with information identifying a type of object to which the signature/pose pair corresponds.

Example Method

Figure 4:
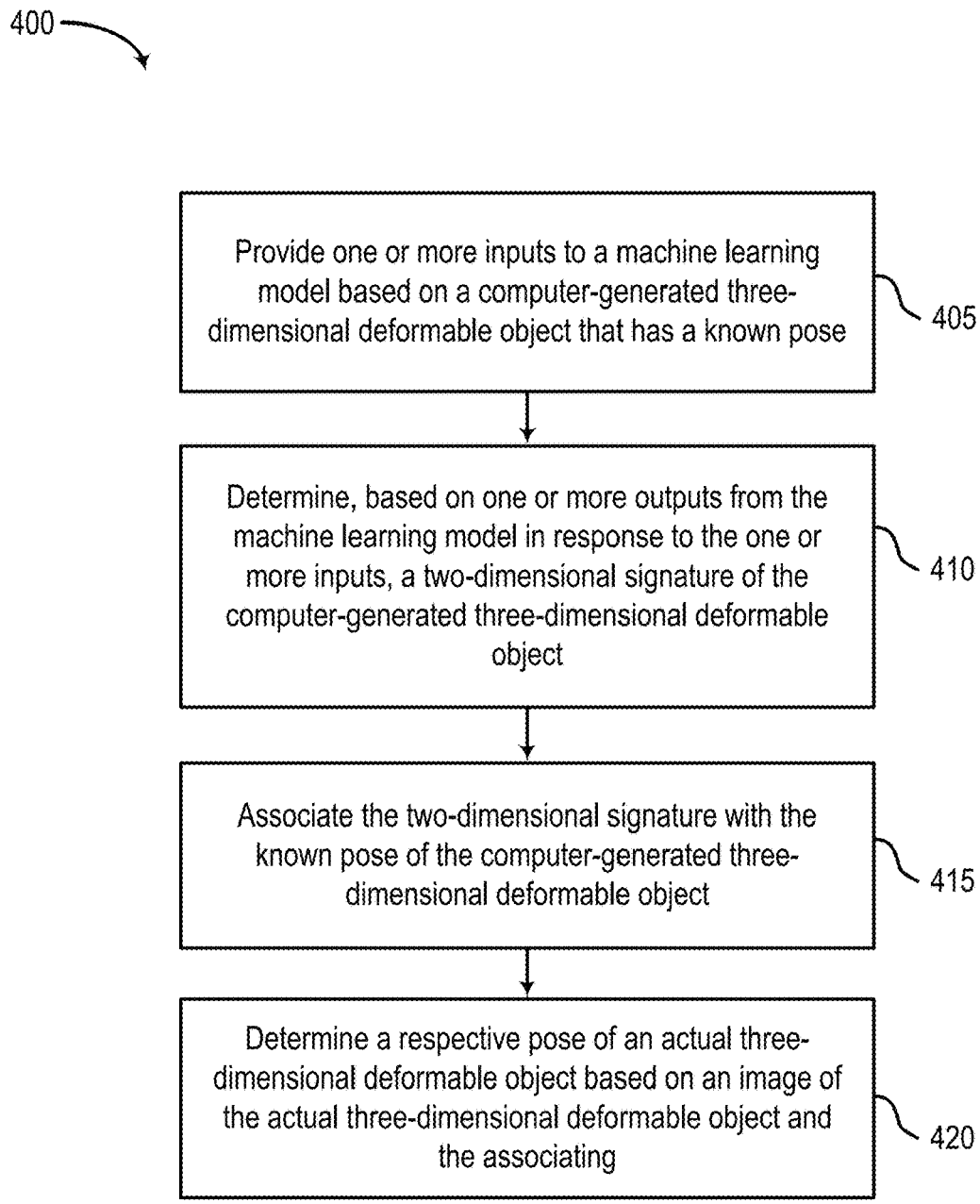
FIG. 4 depicts example operations related to two-dimensional signature matching for pose detection.

FIG. 4 depicts example operations 400 related to two-dimensional signature matching for pose detection according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. In some aspects, a processing system 500 of FIG. 5 may perform operations 400.

Operations 400 begin at step 405, with providing one or more inputs to a machine learning model based on a computer-generated three-dimensional deformable object that has a known pose.

Operations 400 continue at step 410, with determining, based on one or more outputs from the machine learning model in response to the one or more inputs, a two-dimensional signature of the computer-generated three-dimensional deformable object.

In some embodiments, the two-dimensional signature is based on one or more two-dimensional key points of the computer-generated three-dimensional deformable object that are identified by the machine learning model Operations 400 continue at step 415, with associating the two-dimensional signature with the known pose of the computer-generated three-dimensional deformable object. Certain embodiments further comprise storing the two-dimensional signature in association with the known pose in a signature database.

Operations 400 continue at step 420, with determining a respective pose of an actual three-dimensional deformable object based on an image of the actual three-dimensional deformable object and the associating. In certain embodiments, determining the respective pose of the actual three-dimensional deformable object based on the image of the actual three-dimensional deformable object and the associating comprises: providing one or more additional inputs to the machine learning model based on the image; determining, based on one or more additional outputs from the machine learning model in response to the one or more additional inputs, a respective two-dimensional signature of the image; and comparing the respective two-dimensional signature to the two-dimensional signature associated with the known pose.

In some embodiments, determining the respective pose of the actual three-dimensional deformable object based on the image of the actual three-dimensional deformable object and the associating comprises aggregating information related to a plurality of poses in the signature database. For example, the plurality of poses may be associated in the signature database with a plurality of two-dimensional signatures that are closest to a respective two-dimensional signature determined from the image of the actual three-dimensional deformable object. In some embodiments, the aggregating comprises computing a weighted average of points in the plurality of poses.

Example Processing System

Figure 5:
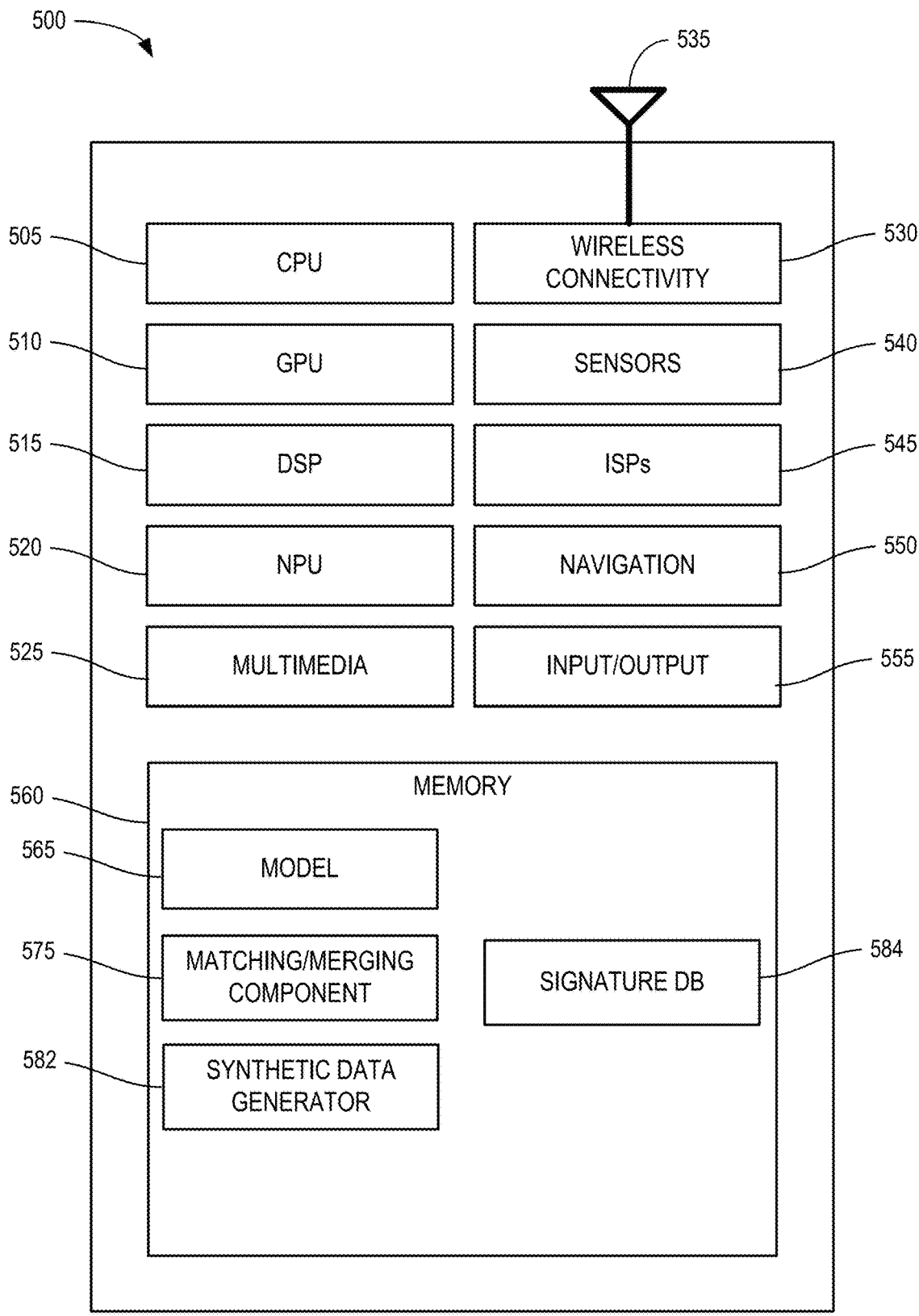
FIG. 5 depicts an example of processing system adapted to perform operations for the techniques disclosed herein, such as the operations depicted and described with respect to FIG. 4.

FIG. 5 depicts an example of processing system 500 that includes various components operable, configured, or adapted to perform operations for the techniques disclosed herein, such as the operations depicted and described with respect to FIG. 4.

Processing system 500 includes a central processing unit (CPU) 505, which in some examples may be a multi-core CPU 505. Instructions executed at the CPU 505 may be loaded, for example, from a program memory 560 associated with the CPU 505 or may be loaded from memory 560 partition.

Processing system 500 also includes additional processing components tailored to specific functions, such as a graphics processing unit (GPU) 510, a digital signal processor (DSP) 515, a neural processing unit (NPU) 520, a multimedia processing unit 525, and a wireless connectivity 530 component.

An NPU 520, such as, is generally a specialized circuit configured for implementing all the necessary control and arithmetic logic for executing machine learning algorithms, such as algorithms for processing artificial neural networks (ANNs), deep neural networks (DNNs), random forests (RFs), kernel methods, and the like. An NPU 520 may sometimes alternatively be referred to as a neural signal processor (NSP), a tensor processing unit (TPU), a neural network processor (NNP), an intelligence processing unit (IPU), or a vision processing unit (VPU).

NPUs 520, such as, may be configured to accelerate the performance of common machine learning tasks, such as image classification, machine translation, object detection, and various other tasks. In some examples, a plurality of NPUs 520 may be instantiated on a single chip, such as a system on a chip (SoC), while in other examples they may be part of a dedicated machine learning accelerator device.

NPUs 520 may be optimized for training or inference, or in some cases configured to balance performance between both. For NPUs 520 that are capable of performing both training and inference, the two tasks may still generally be performed independently.

NPUs 520 designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs 520 designed to accelerate inference are generally configured to operate on complete models. Such NPUs 520 may thus be configured to input a new piece of data and rapidly process it through an already trained model to generate a model output (e.g., an inference).

In some aspects, NPU 520 may be implemented as a part of one or more of CPU 505, GPU 510, and/or DSP 515.

NPU 520 is a microprocessor that specializes in the acceleration of machine learning algorithms. For example, an NPU 520 may operate on predictive models such as artificial neural networks (ANNs) or random forests (RFs). In some cases, an NPU 520 is designed in a way that makes it unsuitable for general purpose computing such as that performed by CPU 505. Additionally or alternatively, the software support for an NPU 520 may not be developed for general purpose computing.

An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted. During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

In some aspects, wireless connectivity 530 component may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity 530 processing component is further connected to one or more antennas 535.

Processing system 500 may also include one or more sensor processing units associated with any manner of sensor, one or more image signal processors (ISPs 545) associated with any manner of image sensor, and/or a navigation 550 processor, which may include satellite-based positioning system components (e.g., GPS or GLONASS) as well as inertial positioning system components.

Processing system 500 may also include one or more input and/or output devices, such as screens, touch-sensitive surfaces (including touch-sensitive displays), physical buttons, speakers, microphones, and the like.

In some examples, one or more of the processors of processing system 500 may be based on an ARM or RISC-V instruction set.

Processing system 500 also includes memory 560, which is representative of one or more static and/or dynamic memories, such as a dynamic random access memory 560, a flash-based static memory 560, and the like. In this example, memory 560 includes computer-executable components, which may be executed by one or more of the aforementioned components of processing system 500.

Examples of memory 560 include random access memory (RAM), read-only memory (ROM), or a hard disk. Examples of memory 560 include solid state memory and a hard disk drive. In some examples, memory 560 is used to store computer-readable, computer-executable software including instructions that, when executed, cause a processor to perform various functions described herein. In some cases, memory 560 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory 560 store information in the form of a logical state.

In particular, in this example, memory 560 includes model parameters (e.g., weights, biases, and other machine learning model parameters). One or more of the depicted components, as well as others not depicted, may be configured to perform various aspects of the methods described herein.

Generally, processing system 500 and/or components thereof may be configured to perform the methods described herein.

Notably, in other aspects, aspects of processing system 500 may be omitted, such as where processing system 500 is a server computer or the like. For example, multimedia component 525, wireless connectivity 530, sensors 540, ISPs 545, and/or navigation 550 component may be omitted in other aspects. Further, aspects of processing system 500 may be distributed.

Note that FIG. 5 is just one example, and in other examples, alternative processing system 500 with more, fewer, and/or different components may be used.

In one aspect, processing system 500 includes CPU 505, GPU 510, DSP 515, NPU 520, multimedia 525, wireless connectivity 530, antennas 535, sensors 540, ISPs 545, navigation 550, input/output 555, and memory 560.

In some aspects, sensors 540 may include optical instruments (e.g., an image sensor, camera, etc.) for recording or capturing images, which may be stored locally, transmitted to another location, etc. For example, an image sensor may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device. In a camera, an image sensors may convert light incident on a camera lens into an analog or digital signal. An electronic device may then display an image on a display panel based on the digital signal. Image sensors are commonly mounted on electronics such as smartphones, tablet personal computers (PCs), laptop PCs, and wearable devices.

In some aspects, sensors 540 may include direct depth sensing sensors, such as radar, LIDAR, and other depth sensing sensors, as described herein.

An input/output 555 (e.g., an I/O controller) may manage input and output signals for a device. Input/output 555 may also manage peripherals not integrated into a device. In some cases, input/output 555 may represent a physical connection or port to an external peripheral. In some cases, input/output 555 may utilize an operating system. In other cases, input/output 555 may represent or interact with a modem, a keyboard, a mouse, a touchscreen, or a similar device. In some cases, input/output 555 may be implemented as part of a processor (e.g., CPU 505). In some cases, a user may interact with a device via input/output 555 or via hardware components controlled by input/output 555.

In one aspect, memory 560 includes model 565, matching/merging component 474, synthetic data generator 582, and signature DB 584.

According to some aspects, model 565 represents machine learning model 320 of FIG. 3. Match/merging component 575 may perform operations related to signature matching and/or merging of candidate poses, such as described with respect to matching/merging 330 of FIG. 3 and matching 206 and weighted merge 210 of FIG. 2.

According to some aspects, synthetic data generator 582 performs operations related to producing computer-generated images of three-dimensional objects, such as synthetic images 302 of FIG. 3, for use in populating signature DB 584. Signature DB 584 may be representative of signature DB 220 of FIGS. 2 and 3.

In some example, such as where processing system 500 is a server computer, certain aspects may be omitted, such as wireless connectivity component 530, antenna(s) 535, multimedia component 525, navigation component 550, and sensor(s) 540.

Notably, FIG. 5 is just use example, and many other examples and configurations of processing system 500 are possible, including implementations involving multiple computing devices.

Example Clauses

Implementation examples are described in the following numbered clauses:

Clause 1: A method, comprising: providing one or more inputs to a machine learning model based on a computer-generated three-dimensional deformable object that has a known pose; determining, based on one or more outputs from the machine learning model in response to the one or more inputs, a two-dimensional signature of the computer-generated three-dimensional deformable object; associating the two-dimensional signature with the known pose of the computer-generated three-dimensional deformable object; and determining a respective pose of an actual three-dimensional deformable object based on an image of the actual three-dimensional deformable object and the associating.

Clause 2: The method of Clause 1, wherein the two-dimensional signature is based on one or more two-dimensional key points of the computer-generated three-dimensional deformable object that are identified by the machine learning model.

Clause 3: The method of any one of Clause 1-2, wherein determining the respective pose of the actual three-dimensional deformable object based on the image of the actual three-dimensional deformable object and the associating comprises: providing one or more additional inputs to the machine learning model based on the image; determining, based on one or more additional outputs from the machine learning model in response to the one or more additional inputs, a respective two-dimensional signature of the image; and comparing the respective two-dimensional signature to the two-dimensional signature associated with the known pose.

Clause 4: The method of any one of Clause 1-3, further comprising storing the two-dimensional signature in association with the known pose in a signature database.

Clause 5: The method of Clause 4, wherein determining the respective pose of the actual three-dimensional deformable object based on the image of the actual three-dimensional deformable object and the associating comprises aggregating information related to a plurality of poses in the signature database.

Clause 6: The method of Clause 5, wherein the plurality of poses are associated in the signature database with a plurality of two-dimensional signatures that are closest to a respective two-dimensional signature determined from the image of the actual three-dimensional deformable object.

Clause 7: The method of any one of Clause 5-6, wherein the aggregating comprises computing a weighted average of points in the plurality of poses.

Clause 8: A processing system, comprising: a memory comprising computer-executable instructions; one or more processors configured to execute the computer-executable instructions and cause the processing system to: provide one or more inputs to a machine learning model based on a computer-generated three-dimensional deformable object that has a known pose; determine, based on one or more outputs from the machine learning model in response to the one or more inputs, a two-dimensional signature of the computer-generated three-dimensional deformable object; associate the two-dimensional signature with the known pose of the computer-generated three-dimensional deformable object; and determine a respective pose of an actual three-dimensional deformable object based on an image of the actual three-dimensional deformable object and the associating.

Clause 9: The processing system of Clause 8, wherein the two-dimensional signature is based on one or more two-dimensional key points of the computer-generated three-dimensional deformable object that are identified by the machine learning model.

Clause 10: The processing system of any one of Clause 8-9, wherein determining the respective pose of the actual three-dimensional deformable object based on the image of the actual three-dimensional deformable object and the associating comprises: providing one or more additional inputs to the machine learning model based on the image; determining, based on one or more additional outputs from the machine learning model in response to the one or more additional inputs, a respective two-dimensional signature of the image; and comparing the respective two-dimensional signature to the two-dimensional signature associated with the known pose.

Clause 11: The processing system of any one of Clause 8-10, wherein the one or more processors are further configured to store the two-dimensional signature in association with the known pose in a signature database.

Clause 12: The processing system of Clause 11, wherein determining the respective pose of the actual three-dimensional deformable object based on the image of the actual three-dimensional deformable object and the associating comprises aggregating information related to a plurality of poses in the signature database.

Clause 13: The processing system of Clause 12, wherein the plurality of poses are associated in the signature database with a plurality of two-dimensional signatures that are closest to a respective two-dimensional signature determined from the image of the actual three-dimensional deformable object.

Clause 14: The processing system of any one of Clause 12-13, wherein the aggregating comprises computing a weighted average of points in the plurality of poses.

Clause 15: A non-transitory computer readable medium comprising instructions that, when executed by one or more processors of a computing system, cause the computing system to: provide one or more inputs to a machine learning model based on a computer-generated three-dimensional deformable object that has a known pose; determine, based on one or more outputs from the machine learning model in response to the one or more inputs, a two-dimensional signature of the computer-generated three-dimensional deformable object; associate the two-dimensional signature with the known pose of the computer-generated three-dimensional deformable object; and determine a respective pose of an actual three-dimensional deformable object based on an image of the actual three-dimensional deformable object and the associating.

Clause 16: The non-transitory computer readable medium of Clause 15, wherein the two-dimensional signature is based on one or more two-dimensional key points of the computer-generated three-dimensional deformable object that are identified by the machine learning model.

Clause 17: The non-transitory computer readable medium of any one of Clause 15-16, wherein determining the respective pose of the actual three-dimensional deformable object based on the image of the actual three-dimensional deformable object and the associating comprises: providing one or more additional inputs to the machine learning model based on the image; determining, based on one or more additional outputs from the machine learning model in response to the one or more additional inputs, a respective two-dimensional signature of the image; and comparing the respective two-dimensional signature to the two-dimensional signature associated with the known pose.

Clause 18: The non-transitory computer readable medium of any one of Clause 15-17, wherein the instructions, when executed by the one or more processors, further cause the computing system to store the two-dimensional signature in association with the known pose in a signature database.

Clause 19: The non-transitory computer readable medium of Clause 18, wherein determining the respective pose of the actual three-dimensional deformable object based on the image of the actual three-dimensional deformable object and the associating comprises aggregating information related to a plurality of poses in the signature database.

Clause 20: The non-transitory computer readable medium of Clause 19, wherein the plurality of poses are associated in the signature database with a plurality of two-dimensional signatures that are closest to a respective two-dimensional signature determined from the image of the actual three-dimensional deformable object.

Clause 21: The non-transitory computer readable medium of any one of Clause 19-20, wherein the aggregating comprises computing a weighted average of points in the plurality of poses.

Clause 22: An apparatus, comprising: means for providing one or more inputs to a machine learning model based on a computer-generated three-dimensional deformable object that has a known pose; means for determining, based on one or more outputs from the machine learning model in response to the one or more inputs, a two-dimensional signature of the computer-generated three-dimensional deformable object; means for associating the two-dimensional signature with the known pose of the computer-generated three-dimensional deformable object; and means for determining a respective pose of an actual three-dimensional deformable object based on an image of the actual three-dimensional deformable object and the associating.

Clause 23: The apparatus of Clause 22, wherein the two-dimensional signature is based on one or more two-dimensional key points of the computer-generated three-dimensional deformable object that are identified by the machine learning model.

Clause 24: The apparatus of any one of Clause 22-23, wherein determining the respective pose of the actual three-dimensional deformable object based on the image of the actual three-dimensional deformable object and the associating comprises: providing one or more additional inputs to the machine learning model based on the image; determining, based on one or more additional outputs from the machine learning model in response to the one or more additional inputs, a respective two-dimensional signature of the image; and comparing the respective two-dimensional signature to the two-dimensional signature associated with the known pose.

Clause 25: The apparatus of any one of Clause 22-24, further comprising means for storing the two-dimensional signature in association with the known pose in a signature database.

Clause 26: The apparatus of Clause 25, wherein determining the respective pose of the actual three-dimensional deformable object based on the image of the actual three-dimensional deformable object and the associating comprises aggregating information related to a plurality of poses in the signature database.

Clause 27: The apparatus of Clause 26, wherein the plurality of poses are associated in the signature database with a plurality of two-dimensional signatures that are closest to a respective two-dimensional signature determined from the image of the actual three-dimensional deformable object.

Clause 28: The apparatus of any one of Clause 26-27, wherein the aggregating comprises computing a weighted average of points in the plurality of poses.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
providing one or more inputs to a machine learning model based on a computer-generated three-dimensional deformable object that has a known pose;
receiving, from the machine learning model in response to the one or more inputs, a two-dimensional signature of the computer-generated three-dimensional deformable object;
storing, in a signature database, an association between the two-dimensional signature received from the machine learning model and the known pose of the computer-generated three-dimensional deformable object; and
determining a respective pose of an actual three-dimensional deformable object based on an image of the actual three-dimensional deformable object and the association stored in the signature database.

2. The method of claim 1, wherein the two-dimensional signature is based on one or more two-dimensional key points of the computer-generated three-dimensional deformable object that are identified by the machine learning model.

3. The method of claim 1, wherein determining the respective pose of the actual three-dimensional deformable object based on the image of the actual three-dimensional deformable object and the association stored in the signature database comprises:
providing one or more additional inputs to the machine learning model based on the image;
determining, based on one or more additional outputs from the machine learning model in response to the one or more additional inputs, a respective two-dimensional signature of the image; and
comparing the respective two-dimensional signature to the two-dimensional signature associated with the known pose in the signature database.

4. The method of claim 1, wherein determining the respective pose of the actual three-dimensional deformable object based on the image of the actual three-dimensional deformable object and the association stored in the signature database comprises aggregating information related to a plurality of poses in the signature database.

5. The method of claim 4, wherein the plurality of poses are associated in the signature database with a plurality of two-dimensional signatures that are closest to a respective two-dimensional signature determined from the image of the actual three-dimensional deformable object.

6. The method of claim 4, wherein the aggregating comprises computing a weighted average of points in the plurality of poses.

7. A processing system, comprising:
a memory comprising computer-executable instructions;
one or more processors configured to execute the computer-executable instructions and cause the processing system to:
provide one or more inputs to a machine learning model based on a computer-generated three-dimensional deformable object that has a known pose;
receive, from the machine learning model in response to the one or more inputs, a two-dimensional signature of the computer-generated three-dimensional deformable object;

store, in a signature database, an association between the two-dimensional signature received from the machine learning model and the known pose of the computer-generated three-dimensional deformable object; and determine a respective pose of an actual three-dimensional deformable object based on an image of the actual three-dimensional deformable object and the association stored in the signature database.

8. The processing system of claim 7, wherein the two-dimensional signature is based on one or more two-dimensional key points of the computer-generated three-dimensional deformable object that are identified by the machine learning model.

9. The processing system of claim 7, wherein determining the respective pose of the actual three-dimensional deformable object based on the image of the actual three-dimensional deformable object and the association stored in the signature database comprises:

providing one or more additional inputs to the machine learning model based on the image;

determining, based on one or more additional outputs from the machine learning model in response to the one or more additional inputs, a respective two-dimensional signature of the image; and comparing the respective two-dimensional signature to the two-dimensional signature associated with the known pose in the signature database.

10. The processing system of claim 7, wherein determining the respective pose of the actual three-dimensional deformable object based on the image of the actual three-dimensional deformable object and the association stored in the signature database comprises aggregating information related to a plurality of poses in the signature database.

11. The processing system of claim 10, wherein the plurality of poses are associated in the signature database with a plurality of two-dimensional signatures that are closest to a respective two-dimensional signature determined from the image of the actual three-dimensional deformable object.

12. The processing system of claim 10, wherein the aggregating comprises computing a weighted average of points in the plurality of poses.

13. A non-transitory computer readable medium comprising instructions that, when executed by one or more processors of a computing system, cause the computing system to:

provide one or more inputs to a machine learning model based on a computer-generated three-dimensional deformable object that has a known pose;

receive, from the machine learning model in response to the one or more inputs, a two-dimensional signature of the computer-generated three-dimensional deformable object;

store, in a signature database, an association between the two-dimensional signature received from the machine learning model with and the known pose of the computer-generated three-dimensional deformable object; and determine a respective pose of an actual three-dimensional deformable object based on an image of the actual three-dimensional deformable object and the association stored in the signature database.

14. The non-transitory computer readable medium of claim 13, wherein the two-dimensional signature is based on one or more two-dimensional key points of the computer-generated three-dimensional deformable object that are identified by the machine learning model.

15. The non-transitory computer readable medium of claim 13, wherein determining the respective pose of the actual three-dimensional deformable object based on the image of the actual three-dimensional deformable object and the association stored in the signature database comprises:

providing one or more additional inputs to the machine learning model based on the image;

determining, based on one or more additional outputs from the machine learning model in response to the one or more additional inputs, a respective two-dimensional signature of the image; and comparing the respective two-dimensional signature to the two-dimensional signature associated with the known pose in the signature database.

16. The non-transitory computer readable medium of claim 13, wherein determining the respective pose of the actual three-dimensional deformable object based on the image of the actual three-dimensional deformable object and the association stored in the signature database comprises aggregating information related to a plurality of poses in the signature database.

17. The non-transitory computer readable medium of claim 16, wherein the plurality of poses are associated in the signature database with a plurality of two-dimensional signatures that are closest to a respective two-dimensional signature determined from the image of the actual three-dimensional deformable object.

18. The non-transitory computer readable medium of claim 16, wherein the aggregating comprises computing a weighted average of points in the plurality of poses.

19. An apparatus, comprising:

means for providing one or more inputs to a machine learning model based on a computer-generated three-dimensional deformable object that has a known pose;

means for receiving, from the machine learning model in response to the one or more inputs, a two-dimensional signature of the computer-generated three-dimensional deformable object;

means for storing, in a signature database, an association between the two-dimensional signature received from the machine learning model and the known pose of the computer-generated three-dimensional deformable object; and means for determining a respective pose of an actual three-dimensional deformable object based on an image of the actual three-dimensional deformable object and the association stored in the signature database.

20. The apparatus of claim 19, wherein the two-dimensional signature is based on one or more two-dimensional key points of the computer-generated three-dimensional deformable object that are identified by the machine learning model.

21. The apparatus of claim 19, wherein determining the respective pose of the actual three-dimensional deformable object based on the image of the actual three-dimensional deformable object and the association stored in the signature database comprises:

providing one or more additional inputs to the machine learning model based on the image;

determining, based on one or more additional outputs from the machine learning model in response to the one or more additional inputs, a respective two-dimensional signature of the image; and comparing the respective two-dimensional signature to the two-dimensional signature associated with the known pose in the signature database.

22. The apparatus of claim 19, wherein determining the respective pose of the actual three-dimensional deformable object based on the image of the actual three-dimensional deformable object and the association stored in the signature database comprises aggregating information related to a plurality of poses in the signature database.

23. The apparatus of claim 22, wherein the plurality of poses are associated in the signature database with a plurality of two-dimensional signatures that are closest to a respective two-dimensional signature determined from the image of the actual three-dimensional deformable object.

24. The apparatus of claim 22, wherein the aggregating comprises computing a weighted average of points in the plurality of poses.

* * * * *